(12) United States Patent  
DeDona et al.

(10) Patent No.: US 8,365,852 B2
(45) Date of Patent: Feb. 5, 2013

(54) POWER SUPPLY SYSTEM AND METHOD FOR POWERING A VEHICLE

(75) Inventors: Matthew DeDona, Northville, MI (US); Majed Mohammed, LaSalle (CA); Josephine Lee, Novi, MI (US); Daryl Sitar, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 2087 days.

(21) Appl. No.: 11/275,262

(22) Filed: Dec. 21, 2005

(65) Prior Publication Data

US 2007/0140670 A1  Jun. 21, 2007

(51) Int. Cl.
*B60W 10/00* (2006.01)
(52) U.S. Cl. ............ 180/65.29; 180/65.265; 180/65.275
(58) Field of Classification Search ......... 180/65.1–65.4
See application file for complete search history.

(56) References Cited

U.S. PATENT DOCUMENTS

| | | | | |
|---|---|---|---|---|
| 4,839,530 | A * | 6/1989 | Greenwood | 307/10.1 |
| 5,510,658 | A * | 4/1996 | Nakayama | 307/10.1 |
| 5,793,189 | A * | 8/1998 | Kawaguchi et al. | 322/28 |
| 6,265,851 | B1 | 7/2001 | Brien et al. | |
| 6,275,004 | B1 * | 8/2001 | Tamai et al. | 320/118 |
| 6,421,261 | B1 | 7/2002 | Fujisawa et al. | |
| 6,481,516 | B1 | 11/2002 | Field et al. | |
| 6,522,960 | B2 * | 2/2003 | Nada | 701/22 |
| 6,668,954 | B2 | 12/2003 | Field | |
| 6,777,909 | B1 * | 8/2004 | Aberle et al. | 320/104 |
| 6,909,201 | B2 * | 6/2005 | Murty et al. | 307/10.1 |
| 7,199,551 | B2 * | 4/2007 | Gauthier et al. | 320/104 |
| 2001/0041952 | A1 * | 11/2001 | Nada | 701/22 |
| 2002/0149261 | A1 | 10/2002 | Vierling et al. | |
| 2002/0154519 | A1 | 10/2002 | Nakahara et al. | |

\* cited by examiner

*Primary Examiner* — Katy M Ebner
(74) *Attorney, Agent, or Firm* — David B. Kelley; Brooks Kushman P.C.

(57) ABSTRACT

A power supply system and method for powering a vehicle are provided that reduce or eliminate the need for a low voltage power storage unit. The system and method are configured to use power from a high voltage storage unit to support low voltage loads, including the load created by the activation of an ignition system.

13 Claims, 2 Drawing Sheets

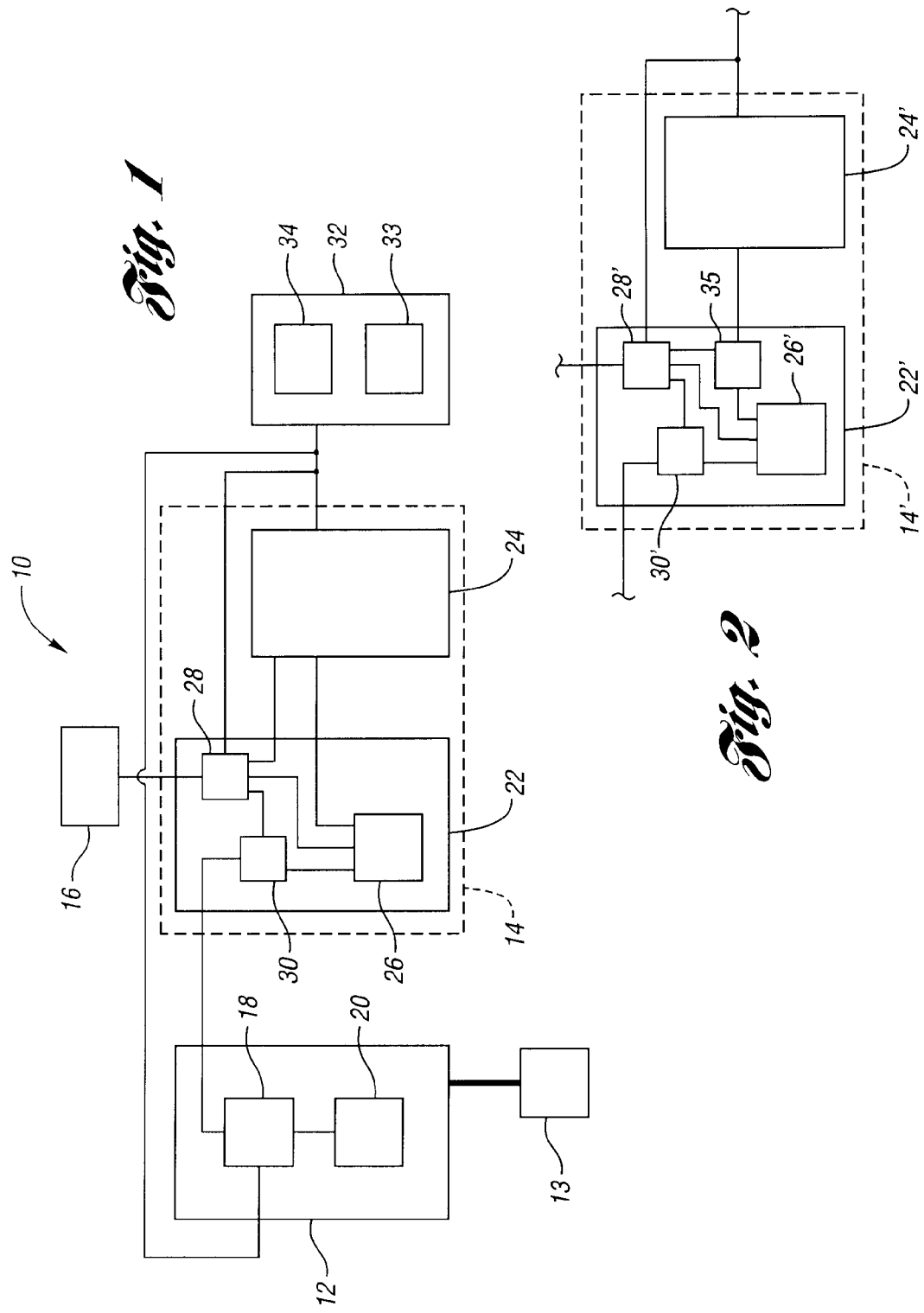

POWER SUPPLY SYSTEM AND METHOD FOR POWERING A VEHICLE

BACKGROUND OF THE INVENTION

1. Field of the Invention

The invention relates to a power supply system and in particular a method for powering a vehicle.

2. Background Art

A variety of vehicles use electricity, and in particular, an electric machine, such as an electric motor, to assist in powering the vehicle. For example, certain electric vehicles are powered exclusively by an electric motor; gasoline or fuel cell hybrid electric vehicles may be selectively powered by an internal combustion engine or an electric motor.

In such vehicles, a high voltage electrical power source, e.g., a high voltage battery, is used to power the high voltage loads of the electric motor. The high voltage electrical power source, in conjunction with a power converter, is also used to support low voltage loads, e.g., a radio, but only after the vehicle is running.

In conventional vehicles, and even in electric or hybrid electric vehicles, a low voltage electrical power source, e.g., a 12 volt battery, is used to power the low voltage loads of the ignition system. Before the ignition system is activated, i.e., when the vehicle is in a key-off state, the low voltage electrical power source also supports other low voltage loads, e.g., an anti-theft device and memory in such devices as radios, clocks, and other electronic devices. These are so-called "key-off" low voltage loads.

Even though the low voltage electrical power source is used to power the low voltage loads of the ignition system and other "key-off" low voltage loads, it occupies space and adds weight to the vehicle. Therefore, a power supply system and method for powering a vehicle that reduce or eliminate the need for a low voltage electrical power source are desired.

SUMMARY OF THE INVENTION

An aspect of the invention provides a power supply system for a vehicle. The vehicle includes wheels and an electric machine operable to provide torque to drive at least one of the wheels. The power supply system comprises an energy storage system capable of providing power to operate the electric machine and a voltage conversion device capable of reducing a voltage of the power provided by the energy storage system. The voltage conversion device is electrically connected to the energy storage system such that at least some of the voltage reduced power provided by the energy storage system can be used to effect an electrical connection between the energy storage system and the electric machine.

An aspect of the invention provides a power supply system for a vehicle. The vehicle includes wheels and an electric machine operable to provide torque to drive at least one of the wheels. The power supply system comprises an energy storage system capable of providing power to operate the electric machine and a voltage conversion device capable of reducing a voltage of the power provided by the energy storage system. The power supply system further comprises an electrical connection between the energy storage system and the voltage conversion device. The electrical connection is configured to allow at least some of the voltage reduced power provided by the energy storage system to effect an electrical connection between the energy storage system and the electric machine.

An aspect of the invention provides a method of providing power to a vehicle. The vehicle includes an electric machine, a system to start the electric machine, a device capable of demanding low voltage power, a voltage conversion device, and an energy storage system capable of providing power to operate the electric machine. The method comprises monitoring the demand for a low voltage power when the electric machine is off and reducing a voltage of at least some of a power provided by the energy storage system when the system to start the electric machine is activated. The method further comprises using at least some of the reduced voltage power to effect an electrical connection between the electric machine and the energy storage system when the system to start the electric machine is activated.

One advantage of the present invention is that it provides a system and method that reduces or eliminates the need for a low voltage electrical power source.

Another advantage of the present invention is that it provides a system and method that uses power from a high voltage electrical power source to support key-off low voltage loads.

BRIEF DESCRIPTION OF THE DRAWINGS

FIG. 1 is a block diagram of an embodiment of a power supply system in accordance with the present invention.

FIG. 2 is a block diagram of another embodiment of a power supply system in accordance with the present invention.

DETAILED DESCRIPTION OF THE PREFERRED EMBODIMENT(S)

Figures 3, 4:
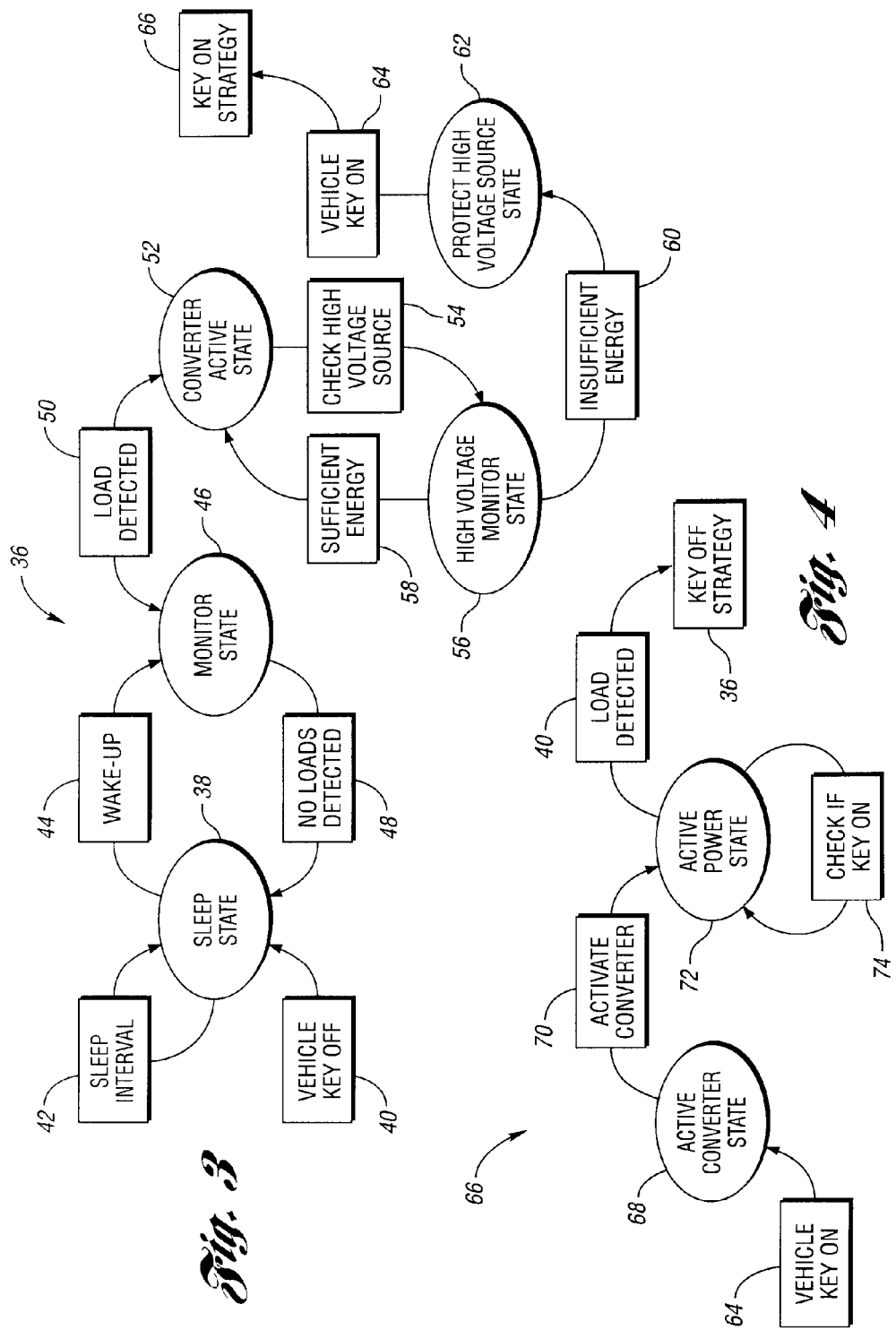
FIG. 3 is a state diagram of a method for using the power supply systems of FIGS. 1 and 2.
FIG. 4 is a state diagram of a method for using the power supply systems of FIGS. 1 and 2.

FIG. 1 shows a power supply system 10 for a vehicle in accordance with one embodiment of the present invention. The power supply system 10 includes an electric drivetrain 12, a high voltage to low voltage active link system 14, and a vehicle controller 16. In contrast to conventional systems, the power supply system 10 lacks a low voltage power source, such as a 12 volt battery.

The electric drivetrain 12 includes an inverter 18 coupled to an electric machine, or motor 20. The inverter 18 is used to convert direct current into alternating current for use by the motor 20. The electric drivetrain 12 is mechanically coupled to the vehicle wheels 13. The high voltage to low voltage active link system 14 includes a high voltage storage system 22 and a voltage conversion device, or converter 24, e.g., a DC/DC converter. The high voltage storage system 22 includes a high voltage power source 26, e.g., a high voltage battery, control electronics 28, and an electrical contact 30.

The electrical contact 30 is configured to act as an electrical switch between the high voltage power source 26 and the electric drivetrain 12. The converter 24 is actively coupled to the high voltage power source 26 such that the electrical connection between the converter 24 and the high voltage power source 26 experiences a high voltage potential when the vehicle is in a power-off state, e.g., key-off state. Because some vehicles may not use a key to initiate vehicle on/off functions, it is worth noting that as used herein, the terms "key-on" and "key-off" refer to general vehicle states. Specifically, a "key-on" state exists when a vehicle is in an operative, or power-on state, regardless of whether a key is used. Similarly, a "key-off" state exists when a vehicle is in an inoperative, or power-off state, again, independent of whether a key is used.

The control electronics 28 are configured to determine whether the vehicle is in a power-on state, e.g., key-on state, or power-off state, e.g., key-off state. The control electronics 28 also control the operation of the electrical contact 30 such that, for example, when the vehicle is in a key-off state, the electrical contact 30 is open, and when the vehicle is in a key-on state, the electrical contact 30 is closed. When the electrical contact 30 is closed, power can flow from the high voltage power source 26 to the electric drivetrain 12. The control electronics 28 are further configured to monitor the demand for low voltage loads 32, such as a key-off low voltage load 33 and to monitor the energy stored by the high voltage power source 26.

As noted above, the system 10 is configured to supply both low voltage power and high voltage power to vehicle systems without using a low voltage power source. Because the ignition system (not shown) is a low voltage load, the system 10 is configured to provide power for the ignition by using power supplied by the high voltage power source 26 after its voltage is reduced by the converter 24. When the ignition is moved from a key-off to a key-on position, the control electronics 28 detect this move, and close the electrical contact 30. This effects an electrical connection between the high voltage power source 26 and the motor 20.

The control electronics 28 are also configured to activate the converter 24 when at least one predetermined condition, such as the presence of a low voltage load 32, is met. Additionally, the control electronics 28 also prevent the activation of the converter 24 when, for example, the electric drivetrain 12 is off and there is insufficient energy in the high voltage power source 26 to simultaneously support a key-off low voltage load 33 and the activation of an ignition system. The control electronics 28 thus ensure that the high voltage power source 26 maintains a minimum amount of energy to support the activation of an ignition system.

In the embodiment shown in FIG. 1, the control electronics 28 reside in the high voltage storage system 22; however, they may also reside in the converter 24, outside the high voltage to low voltage active link system 14, for example in the vehicle controller 16, or in several controllers.

FIG. 2 shows an alternative embodiment of the high voltage to low voltage active link system 14'. This embodiment is similarly configured to the high voltage to low voltage active link system 14 of FIG. 1, but includes a second electrical contact 35 configured to act as an electrical switch between the converter 24' and the high voltage power source 26'.

The control electronics 28' are configured to control the operation of the second electrical contact 35 such that, for example, when the vehicle is in a key-off state, and no low voltage loads 32 are detected, the electrical contact 35 is open. The control electronics 28' also control the operation of the second electrical contact 35 such that when low voltage loads 32 are detected, the electrical contact 35 is closed. Thus, the converter 24' is not actively coupled to the high voltage power source 26' as in the embodiment shown in FIG. 1. Rather, the electrical connection between the converter 24' and the high voltage power source 26' depends upon the operation of the second electrical contact 35.

FIG. 3 shows a key-off strategy 36 associated with the power supply systems of FIGS. 1 and 2 when the vehicle is in a power-off state. This logic will allow the power supply systems of FIGS. 1 and 2 to support low voltage loads 32, e.g., the activation of an ignition system, in the absence of a low voltage power storage unit, e.g., a 12 volt battery. It should be noted that the strategy 36 is not limited to vehicles that use keys. Rather, the strategy 36 broadly applies to any vehicle that experiences a power-off state.

Referring to FIGS. 1 and 3, the control electronics 28 enter a sleep state 38 when the vehicle is put in key-off 40. During the sleep state 38, the control electronics 28 experience a sleep interval 42. At the expiration of each sleep interval 42, the control electronics 28 "wake-up" 44 and check for the presence of key-off low voltage loads 33 at monitor state 46. If no key-off low voltage loads 33 are detected 48, the control electronics 28 return to the sleep state 38. If key-off low voltage loads 33 are detected 50, the control electronics 28 enter the converter active state 52 and activate the converter 24.

The control electronics 28 proceed to check 54 the amount of energy stored in the high voltage power source 26 and enter the high voltage monitor state 56. During the high voltage monitor state 56, the control electronics 28 may determine that there is sufficient energy 58 in the high voltage power source 26 to support a key-off low voltage load 33 and the activation of an ignition system, and thus return to the converter active state 52. Alternatively, the control electronics 28 may determine that there is insufficient energy in the high voltage power source 26 to simultaneously support a key-off low voltage load 33 and the activation of an ignition system, and thus enter the protect high voltage source state 62. During the protect high voltage source state 62, key-off low voltage loads 33 are not supported. If an ignition system is activated, i.e., key-on 64, the control electronics 28 enter a key-on strategy 66 shown in FIG. 4.

Referring to FIGS. 2 and 3, the control electronics 28' enter a sleep state 38 when the vehicle is put in key-off 40. During the sleep state 38, the control electronics 28' experience a sleep interval 42, which may be set to any convenient interval. At the expiration of each sleep interval 42, the control electronics 28' "wake-up" 44 and check for the presence of key-off low voltage loads 33 at monitor state 46. If no key-off low voltage loads 33 are detected 48, the control electronics 28' return to the sleep state 38. If key-off low voltage loads 33 are detected 50, the control electronics 28' enter the converter active state 52 and operate to close the second electrical contact 35 and activate the converter 24'.

The control electronics 28' proceed to check 54 the amount of energy stored in the high voltage power source 26' and enter the high voltage monitor state 56. During the high voltage monitor state 56, the control electronics 28' may determine that there is sufficient energy 58 in the high voltage power source 26' to simultaneously support a key-off low voltage load 33 and the activation of an ignition system, and thus return to the converter active state 52. Alternatively, the control electronics 28' may determine that there is insufficient energy in the high voltage power source 26' to support a key-off low voltage load 33 and the activation of an ignition system, and thus enter the protect high voltage source state 62. During the protect high voltage source state 62, key-off low voltage loads 33 are not supported. If an ignition system is activated, i.e., key-on 64, the control electronics 28' enter a key-on strategy 66 shown in FIG. 4.

FIG. 4 shows a key-on strategy 66 associated with the power supply systems of FIGS. 1 and 2 when the vehicle is on, i.e., in the key-on state. Referring to FIGS. 1 and 4, the control electronics 28 enter active converter state 68 when the vehicle is put in key-on 64. During active converter state 68, the control electronics 28 activate 70 the converter 24, thereby entering the active power state 72. During the active power state 72, the control electronics 28 check 74 if the vehicle continues to be in a key-on state. If the vehicle is in a key-on state, the control electronics 28 return to the active power state 72. If the vehicle is put in key-off 40, the control electronics 28 return to the key-off strategy 36 of FIG. 3.

Referring to FIGS. 2 and 4, the control electronics 28' enter active converter state 68 when the vehicle is put in key-on 64. During active converter state 68, the control electronics 28' operate to close the second electrical contact 35 and activate 70 the converter 24', thereby entering the active power state 72. During the active power state 72, the control electronics 28' check 74 if the vehicle continues to be in a key-on state. If the vehicle is in a key-on state, the control electronics 28' return to the active power state 72. If the vehicle is put in key-off 40, the control electronics 28' return to the key-off strategy 36 of FIG. 3.

While the best mode for carrying out the invention has been described in detail, those familiar with the art to which this invention relates will recognize various alternative designs and embodiments for practicing the invention as defined by the following claims.

What is claimed:

1. A power supply system for a vehicle, the vehicle including wheels and an electric machine operable to provide torque to drive at least one of the wheels, the vehicle further including at least one low voltage device capable of creating a demand for low voltage power and a system to start the electric machine, the power supply system comprising:
   an energy storage system capable of providing power to operate the electric machine;
   a voltage conversion device capable of reducing a voltage of the power provided by the energy storage system, the voltage conversion device being electrically connected to the energy storage system such that at least some of the voltage reduced power provided by the energy storage system can be used to effect an electrical connection between the energy storage system and the electric machine; and
   a controller configured to:
      monitor a demand for low voltage power when the vehicle is in a key-off state,
      monitor the energy stored by the energy storage system when the vehicle is in the key-off state, and
      activate the voltage conversion device when the vehicle is in the key-off state, low voltage power is demanded, and there is sufficient energy in the energy storage system to simultaneously support a low voltage load and activation of the system to start the electric machine.

2. The system of claim 1, wherein the controller is further configured to activate the voltage conversion device upon activation of the system to start the electric machine.

3. The system of claim 1 wherein the controller is further configured to prevent the activation of the voltage conversion device when the electric machine is off and there is insufficient energy in the energy storage system to provide power to the at least one low voltage device.

4. The system of claim 1 wherein the electrical connection between the voltage conversion device and the energy storage system experiences a high voltage potential when the vehicle is in the key-off state.

5. The system of claim 1 wherein the controller is further configured to enter a sleep state when the vehicle is put in the key-off state, and has a wake state following the sleep state, such that when in the wake state the controller monitors a demand for low voltage power when the vehicle is in the key-off state.

6. The system of claim 5 wherein when the controller enters the sleep state the controller experiences a sleep interval, then the controller enters the wake state, the controller being further configured to reenter the sleep state if no demand for low voltage power is detected during the wake state.

7. A power supply system for a vehicle, the vehicle including wheels and an electric machine operable to provide torque to drive at least one of the wheels, the vehicle further including a low voltage device capable of creating a demand for low voltage power and a system to start the electric machine, the power supply system comprising:
   an energy storage system capable of providing power to operate the electric machine;
   a voltage conversion device capable of reducing a voltage of the power provided by the energy storage system;
   an electrical connection between the energy storage system and the voltage conversion device configured to allow at least some of the voltage reduced power provided by the energy storage system to effect an electrical connection between the energy storage system and the electric machine, wherein the electrical connection between the voltage conversion device and the energy storage system experiences a high voltage potential when the vehicle is off; and
   a controller configured to:
      monitor a demand for low voltage power when the vehicle is in a key-off state,
      monitor the energy stored by the energy storage system when the vehicle is in the key-off state, and
      prevent the activation of the voltage conversion device when the electric machine is off and there is insufficient energy in the energy storage system to simultaneously provide power to the low voltage device and the system to start the electric machine.

8. The system of claim 7 wherein the controller is operable to activate the voltage conversion device when at least one predetermined condition is met and activation of the voltage conversion device is not being prevented.

9. The system of claim 8 wherein the at least one predetermined condition includes the presence of a low voltage load.

10. A method of providing power to a vehicle, the vehicle including an electric machine, a system to start the electric machine, a device capable of demanding low voltage power, a voltage conversion device, and an energy storage system capable of providing power to operate the electric machine, the method comprising:
    monitoring the demand for a low voltage power when the vehicle is off;
    reducing a voltage of at least some of a power provided by the energy storage system when the system to start the electric machine is activated;
    using at least some of the reduced voltage power to effect an electrical connection between the electric machine and the energy storage system when the system to start the electric machine is activated;
    monitoring the energy stored by the energy storage system when the vehicle is off; and
    preventing the activation of the voltage conversion device when the vehicle is off and there is insufficient energy in the energy storage system to simultaneously provide power to the low voltage device and the system to start the electric machine.

11. The method of claim 10 further comprising using at least some of the power provided by the energy storage system to operate the electric machine.

12. The method of claim 10 further comprising activating the voltage conversion device when the vehicle is in a key-off state, at least one predetermined condition is met, and activation of the voltage conversion device is not being prevented.

13. The method of claim 12 wherein the at least one predetermined condition includes the presence of a low voltage load current.

* * * * *